United States Patent
Gulla

[11] Patent Number: 6,155,656
[45] Date of Patent: Dec. 5, 2000

[54] SLIDE BAR FOR A SNOWMOBILE TRACK SUSPENSION SYSTEM

[76] Inventor: Joseph M. Gulla, 24 Booth Rd., Methuen, Mass. 01844

[21] Appl. No.: 09/317,931

[22] Filed: May 24, 1999

Related U.S. Application Data
[60] Provisional application No. 60/086,712, May 26, 1998.

[51] Int. Cl.⁷ .................................................. B62D 55/14
[52] U.S. Cl. ............................................................ 305/127
[58] Field of Search .................................. 305/120, 127, 305/181, 168; 184/100, 5; 474/91, 92

[56] References Cited

U.S. PATENT DOCUMENTS

| | | | |
|---|---|---|---|
| 3,770,330 | 11/1973 | Bombardier | 305/127 |
| 3,820,858 | 6/1974 | Reeve | 305/120 |
| 3,841,717 | 10/1974 | Parisotto et al. | 305/127 |
| 3,887,242 | 6/1975 | Russ, Sr. | 305/128 |
| 4,036,320 | 7/1977 | Rabehl | 305/127 |
| 4,666,787 | 5/1987 | Bickle et al. | 425/550 |
| 4,944,714 | 7/1990 | Storck | 474/91 |
| 4,986,795 | 1/1991 | Storck | 474/91 |
| 5,415,470 | 5/1995 | Courtemanche | 305/127 |
| 5,571,275 | 11/1996 | Cyr | 305/127 |

*Primary Examiner*—S. Joseph Morano
*Assistant Examiner*—Long Bao Nguyen
*Attorney, Agent, or Firm*—Vernon C. Maine; Scott J. Asmus

[57] ABSTRACT

A slide bar for snowmobiles has sinusoidal grooves running lengthwise on the sliding surface that open at the aft end of the slide bar for drainage. The sinusoidal grooves retain packed snow accumulated during operation over snow-covered terrain, until the packed snow absorbs sufficient heat to soften and pass through the recurving path of the grooves. The retention characteristic of the sinusoial grooves for holding packed snow provides extended lubrication and cooling to the slide bar and track when the snowmobile leaves snow covered terrain to cross intermittent stretches of bare ground.

15 Claims, 2 Drawing Sheets

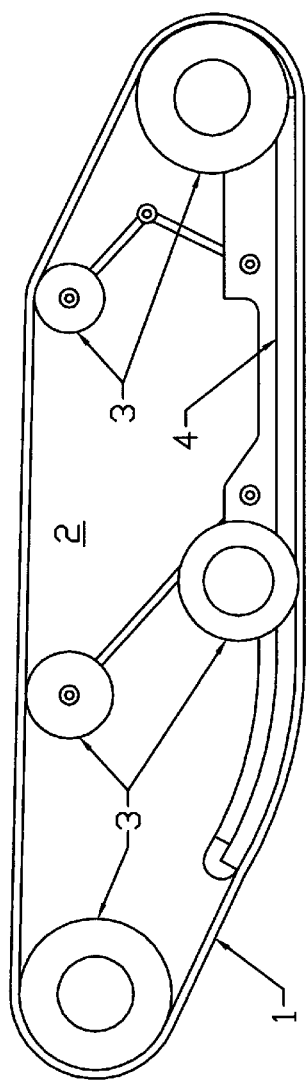
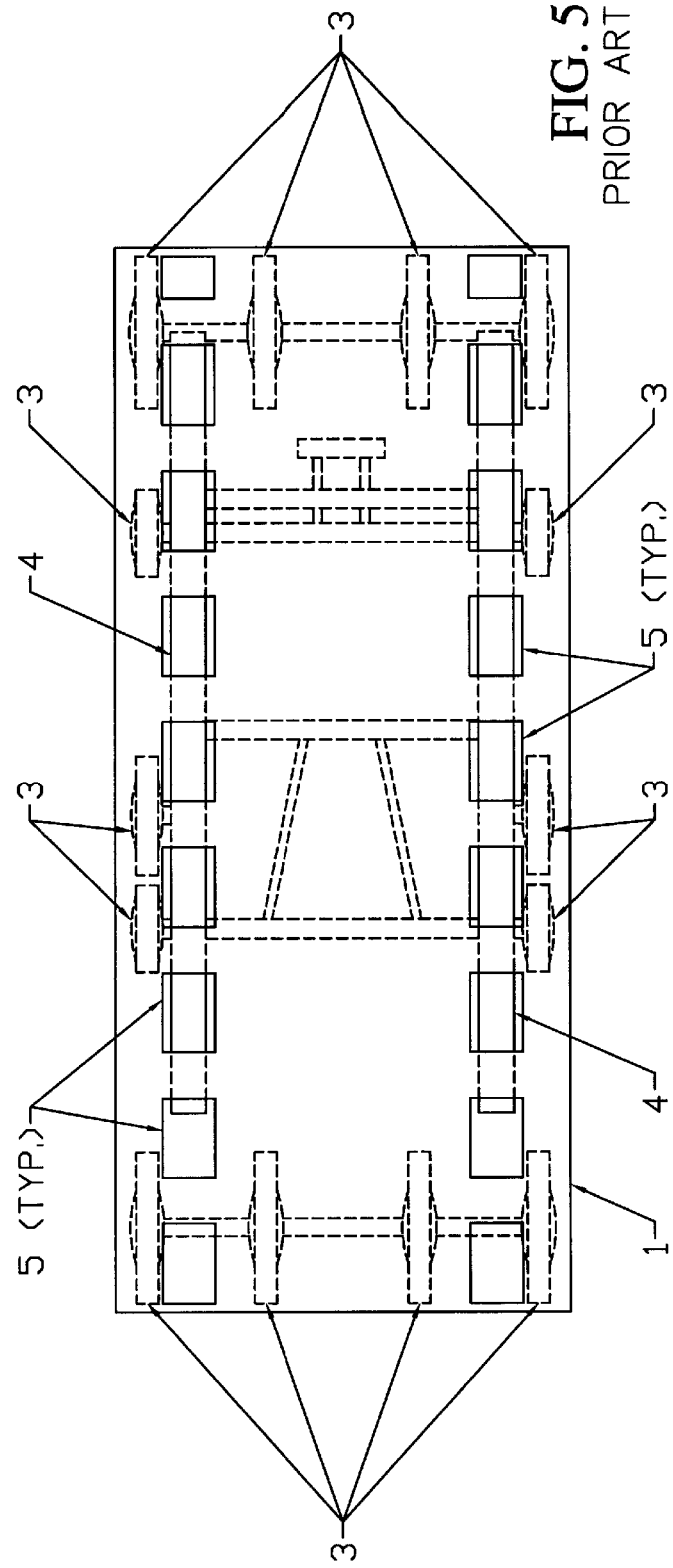

SLIDE BAR FOR A SNOWMOBILE TRACK SUSPENSION SYSTEM

This application claims priority to pending U.S. patent application Ser. No. 60/086,712, filed May 26, 1998, by the same inventor.

BACKGROUND OF THE INVENTION

1. Technical Field of the Invention

This invention relates to slide bar suspension systems used in snowmobile endless track suspensions; and more particularly to a slide bar with improved lubrication and cooling characteristics.

2. Background Art

On a tracked snowmobile, or sled as it may be called, an endless track contacts the snow or ground surface and by the use of a suspension system and motor driven sprockets, rotates the track beneath the sled to propel it forward. Slide bars or sliders or wear blades as they may be variously called, are a key component of the suspension system, having a relatively low friction sliding surface and bearing all or most of the weight of the sled upon the inside surface of the track. There are typically two parallel slide bars running lengthwise within the track; one on each side of the sled. The track rotates around the suspension system and slides under the bars as it contacts the ground surface. Prior art FIGS. 4 and 5 illustrate a typical track and suspension design. Track 1 revolves around suspension system 2, its path defined by the geometry of wheels 3 and slide bar 4. Holes 5 in track 1 admit loose material, be it snow, slush, water, mud, dirt, or what have you, that may be in the path of the snowmobile, into the area of the slide bar and suspension system.

Modern slide bars are typically plastic, in order to provide a low friction sliding surface and a low cost, relatively easily replaceable wear component. It is inherent in the design that the weight and speed of the sleds causes a tremendous heat build up between the track and the bars. The snow and water that penetrates openings in the track and is trapped between the track and slide bar, and impinges on the slide bars from the side, is under normal conditions adequately lubricious to hold down friction and keep the plastic rails within tolerable temperature limits so that friction, support and wear characteristics are not adversely affected.

However, heavier, faster sleds are being operated under ever more wide ranging and adverse conditions for both recreation and business purposes. It is not uncommon for sleds to be purposely run intermittently on surfaces where there is little or no snow or water to cool and lubricate the interface between the slide bar and the track, or on surfaces where debris such as dirt, sand, and gravel may contaminant the interface between the slide bar and the track. This abuse subjects the plastic slide bar to heat and mechanical stresses that increase friction and limit speeds, and quickly deteriorates or destroys the contact surface and/or the mechanical integrity of the slide bar.

A slide rail lubrication system with container, manual pump, and lines directing lubricant to the slide rails was disclosed in Reeve's U.S. Pat. No. 3,820,858. Devices for scavenging or scooping snow from along side the sled as it is in motion, and diverting it towards the slide bar for extra cooling, have been disclosed as in Rabehl's U.S. Pat. No. 4,036,320, further evidencing recognition of the cooling problem.

Lengthwise channels or grooves have been incorporated into the slide rail bearing surface of some slide rail designs, to channel snow and water trapped by the track through the groove for its cooling effect. This structural design leaves a continuous weak shoulder on the rail as is apparent from a cross section view, that is conducive to premature structural failure.

Diagonal channels or grooves in the rail contact surface, as disclosed in Russ, Sr.'s U.S. Pat. No. 3,887,242, have also been employed to enhance cooling, but this type of surface pattern breaks the continuity of the lateral edge support, and introduces a cyclic, longitudinal variation in the available support strength of the slider as the track passes longitudinally beneath the slider under the pressure of the vehicle and riders. The combination of the movement, pressure and the variation in support strength results in a low frequency bounce or vibration in the suspension system that is clearly noticeable to the rider. The ripple effect becomes more noticeable with wear, and at the same time causes wear to be uneven and accelerated, thus exacerbating the problem. The discontinuous lateral edge or shoulder structure weakens the slider and contributes to premature failure under the pressure and vibration. These disadvantages counteract any cooling benefit the feature might have provided.

In summary, excessive heat build up in the slider from the friction of the endless track during prolonged traverses over terrain that is other than snow or slush covered, has an attendant impact on performance and useful life of the slider, and remains a notable problem.

SUMMARY OF THE INVENTION

The invention, in it's simplest form, is a novel slide bar design for the track suspension system of a snowmobile, the goal of which is to more effectively utilize snow encountered and captured in the track system as a slide bar coolant, while avoiding some of the inherent disadvantages of prior art designs.

Wintertime residents of northern latitudes are reminded annually that snow is able to be compacted into shapes and structures that have substantial mechanical stiffness and strength, such as plowed snowbanks and hand-crafted snow sculptures. Eventually, solar radiation injects enough heat into the packed snow to convert its crystalline structure into a liquid or fluid form of slush and water that seeps away in endless rivulets, if not soaked directly into the ground.

Restating a fundamental tenet of the background section, in the context of snowmobiles equipped with slide bars, operators depend on the thermal transfer or cooling effect of snow contacting the hot slide bars while the sled is in motion. Some slide bar designs incorporate linear or diagonal grooves to catch and hold the snow for cooling, the shortcomings of which were previously discussed. For normal parameters of snow temperature, slide bar length, vehicle speed, weight and heat generated, it can generally be said that the longer the snow remains in the groove, the more heat it will absorb.

This applicant's experimentation directed at meeting the general objective of a cooler slide bar for the rotating track of a snowmobile has led to an unexpected result. A straight line groove, whether linear or diagonal, in a slide bar releases packed snow after absorbing just enough heat to break the surface contact with the walls of the groove and then passes along and out of the groove still substantially in its compacted form, without having exhausted its heat absorbing capability. But a properly sized groove with a sinusoidal or recurving path line running lengthwise on the contact surface of the slide bar, will literally pack snow and hold it until it absorbs sufficient heat to break down its compacted form and negotiate the curved path of the groove.

The curving and recurving path line of the groove of the applicant's design restricts the release and flow of the packed snow longer than a straight line groove, until sufficient heat has been absorbed to break down a substantial degree of the mechanical stiffness inherent in the packed snow. This characteristic provides the slide bar with the ability to carry along its own coolant supply, picked up while traversing snow covered terrain, for extending the duration of a ride over a dry patch of ground without generating excessive heat-related friction or causing serious damage to the slide bar. The coolant is carried in the form of packed snow in the slide bar groove, unable to pass out of the until the snow has absorbed enough heat from the track/slide bar interface to melt and pass out the trailing end in substantially a liquid form.

While in practice, the thermal transfer characters are not as precise or as efficient as a simple ice to water conversion, the applicant's testing indicates the design does contribute to extended cooling capacity, as compared to slide bar designs of the prior art.

Retaining the smooth sidewall of the groove allows most particulate matter to be flushed out of the groove in substantially the same manner as a straight line groove. Testing has further confirmed that a slide bar design interchangeable with prior art slide bars or otherwise compatible with slide bar configured snowmobiles, can accommodate a sinusoidal groove pattern while constraining sidewall and groove partition geometry so as to assure constant surface area support and retain sufficient mechanical strength.

It is therefore an object of the invention to provide a slide bar for a snowmobile, with increased capacity for sustaining lubrication and cooling of the sliding surface when a snowmobile is operated intermittently off snow covered terrain over dry patches of ground.

It is a further object to provide a slide bar consisting of an elongate member with an aft end and a forward end, where the member has a means for attaching to the snowmobile's track suspension system and a sliding surface for contacting the track, and where the sliding surface has at least one groove with a sinusoidal path line running substantially the full length of the slide bar and opening without restriction at the aft or back end of the slide bar.

It is a yet further object to provide a slide bar with at least one sinusoidal groove on the sliding surface and with shoulders on the sliding surface outboard of the groove or grooves, where the shoulders have a cross section area at least as wide as high.

It is a still yet further object to provide a slide bar with two parallel, sinusoidal grooves spaced apart by a partition having a cross section area at least as wide as high.

It is another object of the invention to provide a slide bar with at least one sinusoidal groove in the sliding surface and a tee slot on the top side opposite the sliding surface, the tee slot running substantially the full length of the slide bar and opening without restriction at at least one end so as to enable mounting of the slide bar on an elongated, matching tee rail structure attached to the track suspension system of a snowmobile.

It is yet another object to provide a slide bar with at least one sinusoidal groove in the sliding surface and a pair of opposing mounting slots, one in each vertical side of the slide bar, the pair of slots running the length of the slide bar and opening without restriction at at least one end of the slide bar so as to enable mounting of the slide bar on a long, open box rail structure attached to the track suspension system of a snowmobile.

It is still yet another object to provide a slide bar with at least one sinusoidal groove in the sliding surface and an attachment hole at the forward end of the slide bar for placement of a fastener connecting to the snowmobile's track suspension system.

It is yet still another object to provide a slide bar with at least one sinusoidal groove in the sliding surface and a visual indicator at the aft end for indicating when it is time to replace the of slide bar due to the sliding surface having been worn down to a predetermined minimum remaining depth.

It is a further object to provide a slide bar with at least one sinusoidal groove in the sliding surface, molded from polymeric material.

Still other objects and advantages of the present invention will become readily apparent to those skilled in this art from the following detailed description, wherein I have shown and described only a preferred embodiment of the invention, simply by way of illustration of the best mode contemplated by me on carrying out my invention.

BRIEF DESCRIPTION OF THE DRAWINGS

FIG. 4 is a side elevation of a typical suspension system and track, illustrating the placement of a slide bar.

FIG. 5 is a bottom view of the track of FIG. 4, with dotted line underlay of the suspension system.

DESCRIPTION OF THE PREFERRED EMBODIMENT

The invention is susceptible of many variations. Accordingly, the drawings and following description of the preferred embodiment are to be regarded as illustrative in nature, and not as restrictive.

Figure 1:
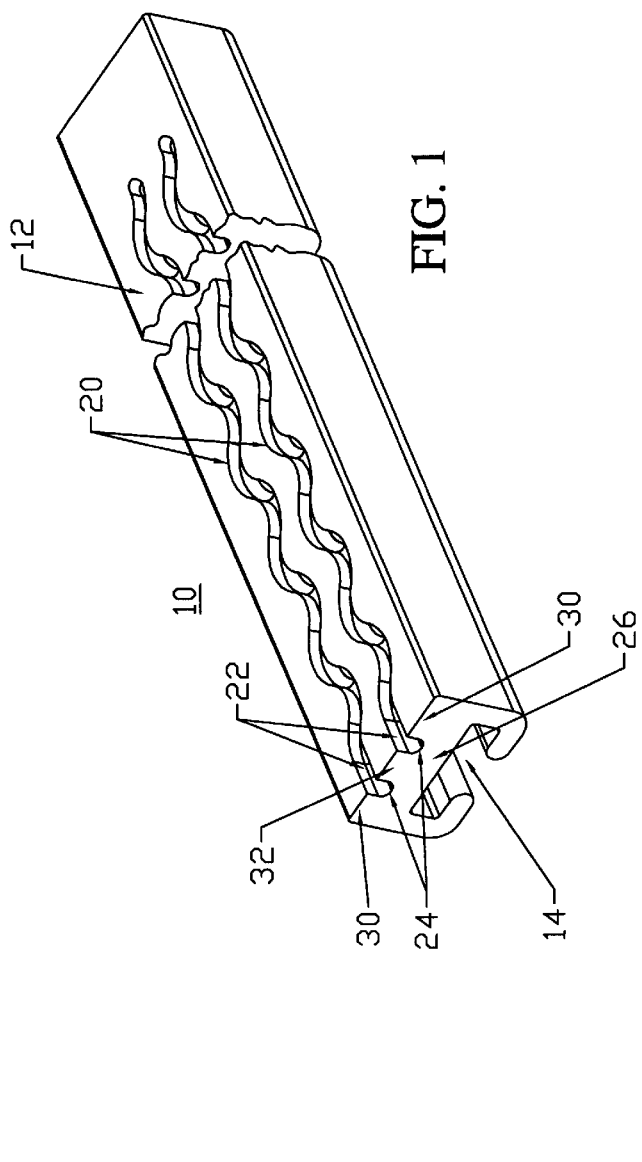
FIG. 1 is a partial perspective view of the preferred embodiment of the invention, in the form of parallel, sinusoidal grooves formed in the bearing surface of the slide bar, and running longitudinally substantially the length of the slide bar, exiting at the aft end.
Figure 3:
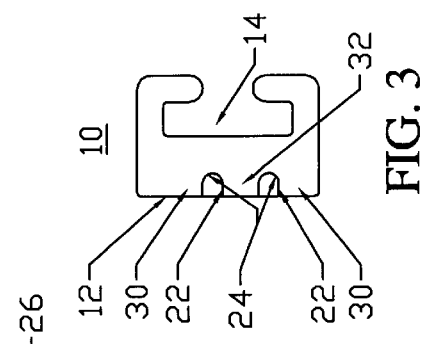
FIG. 3 is a cross section view of the slide bar of FIG. 1, showing the T slot for mounting onto the rail guide of a snowmobile.
Figure 2:
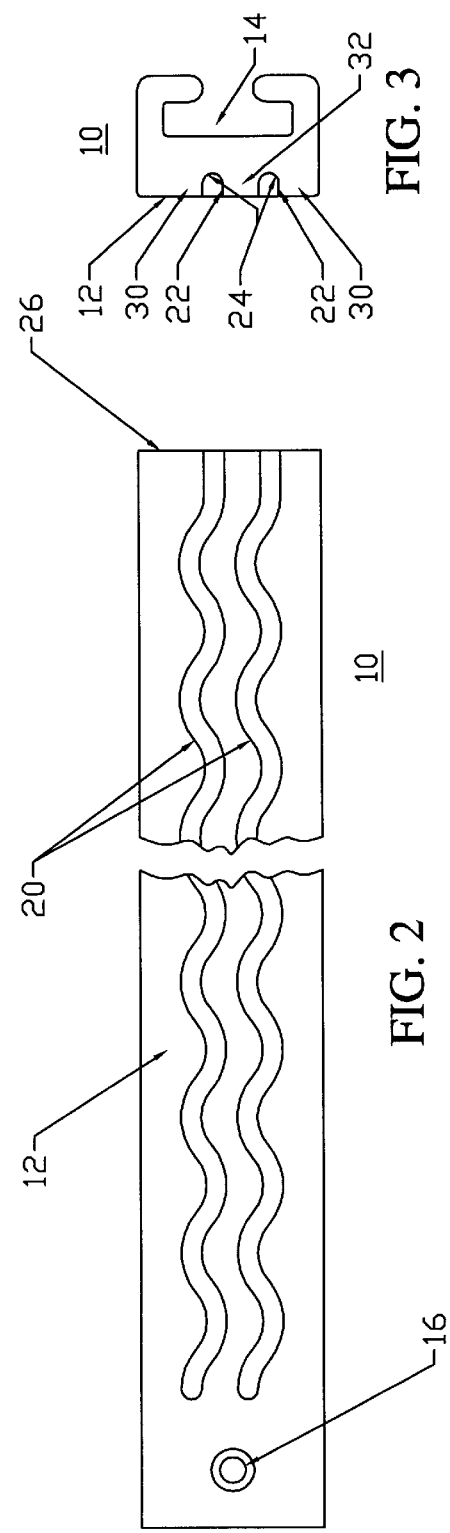
FIG. 2 is a bottom view of the slide bar of FIG. 1, showing a countersunk attachment hole at the forward end.

Referring to FIGS. 1, 2, and 3, slide bar 10 is an elongate plastic or polymeric member with a sliding surface 12 and a longitudinal T slot 14 in the opposite side surface running end to end, for mounting on the rail guide of the suspension system of a snowmobile. Attachment hole 16 in the forward end of the slide bar is countersunk on the sliding surface 12 for accepting a fastener that screws into the rail guide to secure the slide bar to the rail guide.

Two parallel, sinusoidal grooves 20 are formed into sliding surface 12. The grooves have sidewalls 22 and full, semi-circular inner radius 24. The twin grooves are characterized by having parallel sinusoidal paths that run substantially the full length of slide bar 10, opening at the back or aft end of the slide bar at 26 so as to drain melting snow and water freely and flush small particles of foreign matter that may have accumulated between the slide bar and the track. The width of an oscillation of a groove is greater than the width of the groove, assuring that a degree of fluidity is required before compacted material can transit the recurving groove.

It will be apparent that the path line of grooves 20 provides for a longer overall groove length than would a straight line path. This results in a groove that will contain more volume of packed snow and water, and have a greater sidewall surface area for thermal transfer than would a straight line groove. On the other hand, it will be likewise apparent that the resistance to the outflow of water will not be greatly affected by whether the groove is straight or smoothly recurving. Hence the mantra; "pack snow, pass water".

The overall width and location of the path line of grooves 20 is constrained so as to maintain the width of shoulder cross section 30 at least as great as its height, assuring that the shoulder or lateral edge of the slide bar is continuous and not unduly weakened by the grooves. Likewise, the width of partition cross section 32 dividing the two grooves 20 is at least as great as its height, for the same reason. It will be apparent that the available support surface area of sliding surface 12 is constant over the length of the slide bar.

In practice, while operating over snow covered terrain, snow impacting from through the track and from the sides is packed into the grove of the slide bar, lubricating the sliding surface and absorbing heat from the track and slide bar friction action until the melting snow and water are sufficiently fluid to drain out or pass through the curved length of the groove.

It will be further apparent that slide bar 10 will accept and work as well with any of the various substitute lubricants used with other plastic slide bars in off-snow environments, such as in grass drag racing in the summer months when some operators use dish detergent to lubricate the slide bars.

As will be realized, the invention is capable of other and different embodiments, and its several details are capable of modifications in various obvious respects, all without departing from the essence of the invention.

As an example, there may be one or more grooves in the sliding surface of the slide bar. There may be variations and irregularities in the path line pattern of the groove. The forward end of the groove may or may not open to the side or forward end of the slide bar. Multiple grooves need not be parallel, as long as the integrity of the shoulder or lateral edge of the slide bar is maintained. The cross section of a grove need not be uniform over its length, and may be configured to have pockets of additional volume into which snow may be packed by the normal operation and interaction of track and slide bar. All to the end of packing snow and passing water without unduly increasing the friction as between the slide bar and the track or reducing the strength and wear characteristics of the slide bar.

As a further example, although slide bars are predominantly manufactured from plastics, the configuration of the invention is applicable to other materials, or to slide bars constructed of a composite material or of laminated materials. Further, the means for mounting to the suspension system of a sled or snowmobile may be by a pair of opposing slots in the vertical sides of the slide bar, so that the slide bar can be slipped into a long open box rail or channel rail member on the suspension system. The material of manufacture and the mounting means are subordinate to the sinusoidal groove feature of the invention.

As a yet further example, the aft exiting grooves may be designed to be visual indicators of normal wear of the sliding surface, analogous to the tread depth/wear indicators on tires, signaling the user of the need for replacement when the groove exit profile has been worn away.

While a fully enabling disclosure of the preferred embodiment has been illustrated and described, it is not to be construed as a limitation of the scope of the invention, the claims for which:

I claim:

1. A slide bar for a snowmobile employing a revolving endless track and track suspension system, comprising an elongate member with an aft end and a forward end, said member having means for attaching to said track suspension system and a sliding surface for contacting said endless track, said sliding surface configured with at least one groove having a sinusoidal path line running substantially the full length of said member and opening without restriction at said aft end of said member.

2. The slide bar of claim 1, said slide bar having shoulders outboard of said at least one groove, said shoulders having a cross section area at least as wide as high.

3. The slide bar of claim 1, said at least one groove being two parallel grooves spaced apart by a partition having a cross section area at least as wide as high.

4. The slide bar of claim 1, said means for attaching to a track suspension system comprising a tee slot in said member on the top side opposite said sliding surface, said tee slot running the length of said member and opening without restriction at at least one end of said member so as to enable mounting of said member on an elongate tee rail structure extending from said track suspension system.

5. The slide bar of claim 1, said means for attaching to a track suspension system comprising a pair of opposing slots, one in each vertical side of said member, said pair of slots running the length of said member and opening without restriction at at least one end of said member so as to enable mounting of said member on an elongate open box rail extending from said track suspension system.

6. The slide bar of claim 1, said means for attaching to a track suspension system further comprising an attachment hole at said forward end of said member for placement of a fastener connecting to said track suspension system.

7. The slide bar of claim 1, further comprising said aft end of said slide bar configured as a visual indicator for replacement of said of slide bar when said sliding surface has been worn down to a pre-determined minimum remaining depth.

8. The slide bar of claim 7, said visual indicator being the absence of any said groove.

9. The slide bar of claim 1, molded from polymeric material.

10. A slide bar for a snowmobile employing a revolving endless track and track suspension system, comprising an elongate member with an aft end and a forward end, said member having means for attaching to said track suspension system and a sliding surface for contacting said endless track, said sliding surface configured with two parallel grooves spaced apart by a partition having a cross section area at least as wide as high, said parallel grooves having a sinusoidal path line running substantially the full length of said member and each opening without restriction at said aft end of said member.

11. The slide bar of claim 10, said slide bar having shoulders outboard of said at least one groove, said shoulders having a cross section area at least as wide as high.

12. The slide bar of claim 11, said means for attaching to a track suspension system comprising a tee slot in said member on the top side opposite said sliding surface, said tee slot running the length of said member and opening without restriction at at least one end of said member so as to enable mounting of said member on an elongate tee rail structure extending from said track suspension system.

13. The slide bar of claim 12, said means for attaching to a track suspension system further comprising an attachment hole at said forward end of said member for placement of a fastener connecting to said track suspension system.

14. The slide bar of claim 12, further comprising said aft end of said slide bar configured as a visual indicator for replacement of said of slide bar when said sliding surface has been worn down to a pre-determined minimum remaining depth, said visual indicator being the absence of any said groove.

15. The slide bar of claim 14, molded from polymeric material.

* * * * *